United States Patent
Gross et al.

(10) Patent No.: US 11,412,387 B2
(45) Date of Patent: Aug. 9, 2022

(54) CAMOUFLAGING EMI FINGERPRINTS IN ENTERPRISE COMPUTER SYSTEMS TO ENHANCE SYSTEM SECURITY

(71) Applicant: Oracle International Corporation, Redwood Shores, CA (US)

(72) Inventors: Kenny C. Gross, Escondido, CA (US); Ashin George, San Diego, CA (US); Guang C. Wang, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 14 days.

(21) Appl. No.: 17/230,156

(22) Filed: Apr. 14, 2021

(65) Prior Publication Data

US 2021/0235275 A1 Jul. 29, 2021

Related U.S. Application Data

(62) Division of application No. 16/258,544, filed on Jan. 26, 2019, now Pat. No. 11,012,862.

(51) Int. Cl.
*G06F 21/75* (2013.01)
*H04L 9/40* (2022.01)
*H04W 12/79* (2021.01)
*H04W 12/108* (2021.01)

(52) U.S. Cl.
CPC .......... *H04W 12/79* (2021.01); *G06F 21/755* (2017.08); *H04W 12/108* (2021.01)

(58) Field of Classification Search
CPC ... H04W 12/79; H04W 12/108; G06F 21/755; G06F 21/75; H04L 63/20
See application file for complete search history.

(56) References Cited

U.S. PATENT DOCUMENTS

| 9,966,057 | B1 | 5/2018 | Wang |
| 2006/0029229 | A1 | 2/2006 | Trifonov et al. |
| 2010/0161525 | A1 | 6/2010 | Gross et al. |
| 2012/0237040 | A1 | 9/2012 | Holland et al. |
| 2014/0286462 | A1* | 9/2014 | Wu .......................... H04L 27/01 375/343 |
| 2016/0294655 | A1* | 10/2016 | Lin .......................... H04L 43/50 |
| 2016/0299182 | A1* | 10/2016 | Tsukamoto ........ G01R 29/0814 |
| 2018/0348759 | A1 | 12/2018 | Freeman et al. |

OTHER PUBLICATIONS

Active Countermeasure using EMI Honeypot against TEMPEST Eavesdropping in High-Speed Signalling, by Yao et al. (Year: 2018).*

* cited by examiner

*Primary Examiner* — Vu V Tran
(74) *Attorney, Agent, or Firm* — Park, Vaughan, Fleming & Dowler LLP

(57) ABSTRACT

The disclosed embodiments relate to a system that camouflages EMI fingerprints in EMI emissions from a computing system to enhance system security. During operation, the system monitors the EMI emissions from the computer system during operation of the computer system to produce corresponding EMI signals. Next, the system determines a dynamic amplitude of the EMI emissions based on the EMI signals. If the dynamic amplitude of the EMI emissions drops below a threshold value, the system executes synthetic transactions, which have interarrival times that, when superimposed on a workload of the computer system, cause the computer system to produce randomized EMI emissions.

18 Claims, 6 Drawing Sheets
(1 of 6 Drawing Sheet(s) Filed in Color)

CAMOUFLAGING EMI FINGERPRINTS IN ENTERPRISE COMPUTER SYSTEMS TO ENHANCE SYSTEM SECURITY

RELATED APPLICATION

This application is a divisional application of, and hereby claims priority under 35 U.S.C. § 120 to, pending U.S. patent application Ser. No. 16/258,544, entitled "Camouflaging EMI Fingerprints in Enterprise Computing Systems to Enhance System Security," by inventors Kenny C. Gross, et al., filed on 26 Jan. 2019, which is hereby incorporated by reference.

BACKGROUND

Field

The disclosed embodiments generally relate to techniques for enhancing security in enterprise computer systems. More specifically, the disclosed embodiments relate to a technique for camouflaging electromagnetic interference (EMI) fingerprints in enterprise computer systems to enhance system security.

Related Art

A number of recent security breaches in corporate computer systems have resulted in the theft of confidential information belonging to millions of users. As a result, companies are somewhat reluctant to entrust their data and business-critical transactions to conventional multi-tenant, cloud-computing platforms, where multiple customers share the same servers. Cloud-computing providers have attempted to address these concerns by developing cloud-computing architectures that provide single-tenant isolation, which prevents different customers from sharing the same server.

However, even in single-tenant architectures there still exist security vulnerabilities that could potentially lead to a data breach. For example, EMI fingerprint technology has been successfully used to gather information from servers through inexpensive antennae located in proximity to servers. (See U.S. Pat. No. 7,613,580 entitled "Method and Apparatus for Generating an EMI Fingerprint for a Computer System," by inventors Kenny C. Gross, et al., filed on 12 Apr. 2007, which is incorporated by reference herein.) This EMI fingerprint technology has even been demonstrated to operate effectively despite the "Faraday cage" effect, which limits electromagnetic radiation from servers housed in metal casings. Moreover, EMI fingerprint technology can also be used to monitor computer systems that provide "air gap security," where no wires go into or out of the computer system through which sensitive information can possibly be extracted.

Although EMI fingerprint technology has been developed for beneficial purposes, such as proactive fault monitoring, and detecting counterfeit electronics, EMI fingerprint technology can also be used by malicious actors to determine transactional activity and packet contents, even in computer systems that guarantee single-tenant isolation, and air-gap security.

Hence, what is needed is a technique for mitigating security vulnerabilities in computer systems that arise from malicious use of EMI fingerprint technology.

SUMMARY

The disclosed embodiments relate to a system that camouflages electromagnetic interference (EMI) fingerprints in EMI emissions from a computing system to enhance system security. During operation, the system monitors the EMI emissions from the computer system while the computer system is operating to produce corresponding EMI signals. Next, the system performs a Fast Fourier Transform (FFT) operation on the EMI signals. The system then converts an output of the FFT operation into a frequency-domain representation of the EMI signals. Next, the system generates a camouflaging signal based on the frequency-domain representation of the EMI signals. Finally, the system outputs the camouflaging signal through a transmitter to camouflage EMI fingerprints in the EMI emissions from the computer system.

In some embodiments, converting the output of the FFT operation into the frequency-domain representation involves producing a power spectral density (PSD), which represents a spectral energy distribution of the EMI signals. In these embodiments, generating the camouflaging signal involves producing an antiphase signal to camouflage the EMI signals by lagging a phase angle of the PSD by 180°.

In some embodiments, converting the output of the FFT operation into the frequency-domain representation involves partitioning the output of the FFT operation into separate frequency bins. In these embodiments, generating the camouflaging signal involves generating noise at a frequency associated with a lowest-amplitude frequency bin, thereby filling in the lowest-amplitude frequency bin, and then iteratively repeating the process of filling in the lowest-amplitude frequency bin until a termination condition is met to smooth out the frequency-domain representation sufficiently that the spectrum for each bin is indistinguishable from random noise. Note that this termination condition can involve ensuring that the amplitude of each frequency bin is within a pre-specified percentage of an average amplitude for all of the frequency bins, such that the camouflaged signal in each bin appears random.

In some embodiments, the EMI emissions from the computer system are monitored using one of the following: an external antenna; a radiofrequency (RF) demodulator, a software-defined radio (SDR), a dongle, which is coupled to a port of the computer system; an electrical lead, which is coupled to a ground line in the computer system; and an electronic device located in a hard drive slot filler, which is inserted into a hard drive slot in the computer system.

In some embodiments, generating the camouflaging signal involves using one or more idle cores in the computer system to generate the camouflaging signal.

In some embodiments, generating the camouflaging signal involves using an electrical circuit within the computer system to generate the camouflaging signal.

In some embodiments, generating the camouflaging signal involves using one or more idle threads in the computer system to generate the camouflaging signal.

In some embodiments, the computer system comprises a server in an enterprise computer system.

The disclosed embodiments also relate to another system that camouflages EMI fingerprints in EMI emissions from a computing system to enhance system security. During operation, the system monitors the EMI emissions from the computer system during operation of the computer system to produce corresponding EMI signals. Next, the system determines a dynamic amplitude of the EMI emissions based on the EMI signals. If the dynamic amplitude of the EMI emissions drops below a threshold value, the system executes synthetic transactions, which have interarrival times that, when superimposed on a workload of the computer system, cause the computer system to produce randomized EMI emissions.

In some embodiments, executing the synthetic transactions involves using one or more idle cores and/or idle threads in the computer system to execute the synthetic transactions.

In some embodiments, executing the synthetic transactions involves using a special-purpose chip in the computer system to execute the synthetic transactions.

In some embodiments, the randomized EMI emissions are random with respect to a moving-window Kolmogorov-Smirnov test statistic.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Technical Details

While researching EMI fingerprints, one of the inventors conducted an experiment, which involved creating a script that performed "buffer stuffing" to addressable memory, and then retrieved the data from memory and wrote the data to storage. During this process, a stream of packets was generated containing all AAAAs, BBBBs, . . . , ZZZZs. The system was then trained in an inferential mode, to recognize the associated "fingerprints" of the alphabetic patterns in the packets. These experiments demonstrated that it is possible to "read" simple alphabetic patterns from outside a server.

Figure 2:
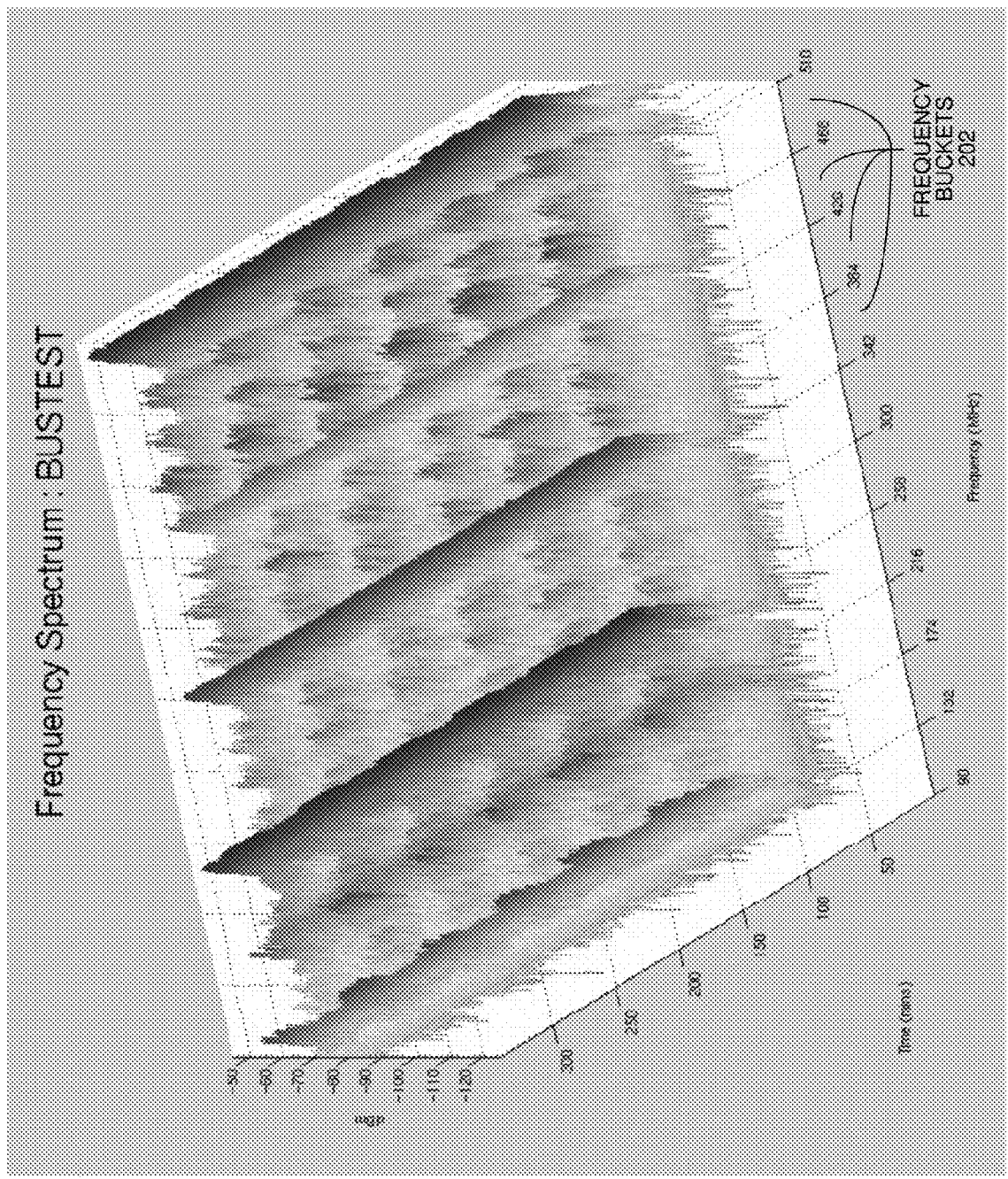
FIG. 2 presents graphs illustrating an exemplary EMI spectrum emanating from a server in accordance with the disclosed embodiments.

For example, FIG. 2 illustrates how the radio frequency spectrum can be "binned" into frequency buckets 202. Note that the amplitude information, which comprises "ridges" that define the EMI fingerprints, is output at relatively low frequencies, up to kHz for conventional prognostics, up to MHz for inference of transactional activity, and up to multi-GHz for inference of packet content.

Figure 1:
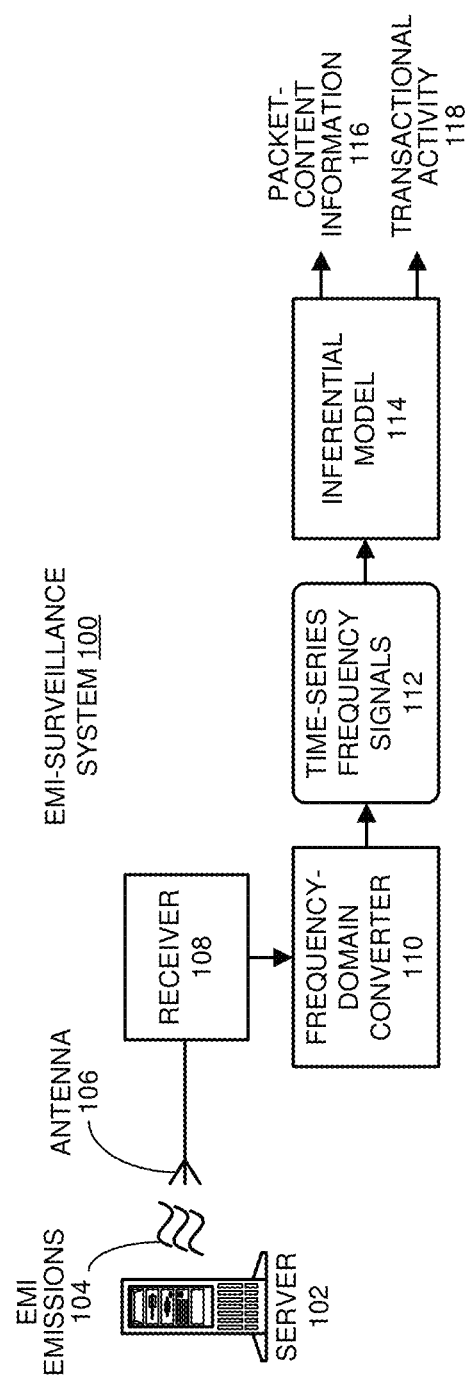
FIG. 1 illustrates an exemplary EMI-surveillance system in accordance with the disclosed embodiments.

FIG. 1 illustrates an exemplary EMI-surveillance system 100 that can read EMI patterns from outside a server in accordance with the disclosed embodiments. As illustrated in FIG. 1, a server 102 generates EMI emissions 104 during normal operation. These EMI emissions 104 can be monitored using an antenna 106, or alternatively through a lead, which is connected to a ground wire in server 102. The antenna 106 converts the EMI emissions 104 into corresponding analog signals, which feed through a receiver 108 that converts the analog electrical into corresponding digital signals, which feed into frequency-domain converter 110. Frequency-domain converter 110 then performs an FFT operation on the digital signals that produces a set of time-series frequency signals 112. Next, time-series frequency signals 112 feed into an inferential model 114, such as a Multivariate State Estimation Technique (MSET) model, which has been trained to recognize packet-content information 116 and transactional activity 118 in the time-series frequency signals 112.

Although EMI fingerprint technology has been demonstrated to work well using a simple stripped wire as an antenna, researchers have designed even better external and internal antennae for EMI fingerprint applications. (See U.S. Pat. No. 8,457,913, entitled "Computer System with Integrated Electromagnetic-Interference Detectors" by inventors Steven F. Zwinger, et al., filed on 4 Jun. 2008, which is incorporated by reference herein.) It has also been demonstrated that for enterprise servers ideal antennae are already designed into almost all existing servers, namely the USB ground wire. Note that low-cost servers typically provide several USB ports, and the bigger servers provide even more.

The above-described EMI-surveillance technology makes it possible for a malicious actor who rents space in a server in "slot N" in a standard datacenter rack of servers to eavesdrop on transactional activity in slot N+1 or N−1 in the same rack. It is also possible for a malicious actor to use a hand-held wand or other external antenna to monitor transactional activity inside a server. A malicious actor can also use a modified USB dongle, which is plugged into a computer, to tap directly into the internal USB ground wire.

Note that the technology to extract EMI fingerprints is extremely cheap. However, the processing required to infer packet-content information is substantial and may require performing pattern-recognition techniques, such as MSET on a high-powered special purpose graphics-processing unit (GPU). Because it is relatively inexpensive to "eavesdrop" on ostensibly isolated servers, it is desirable to develop proactive countermeasures that "camouflage" the information content in EMI signatures so that information cannot be exfiltrated by users with malicious intent.

Figure 3:
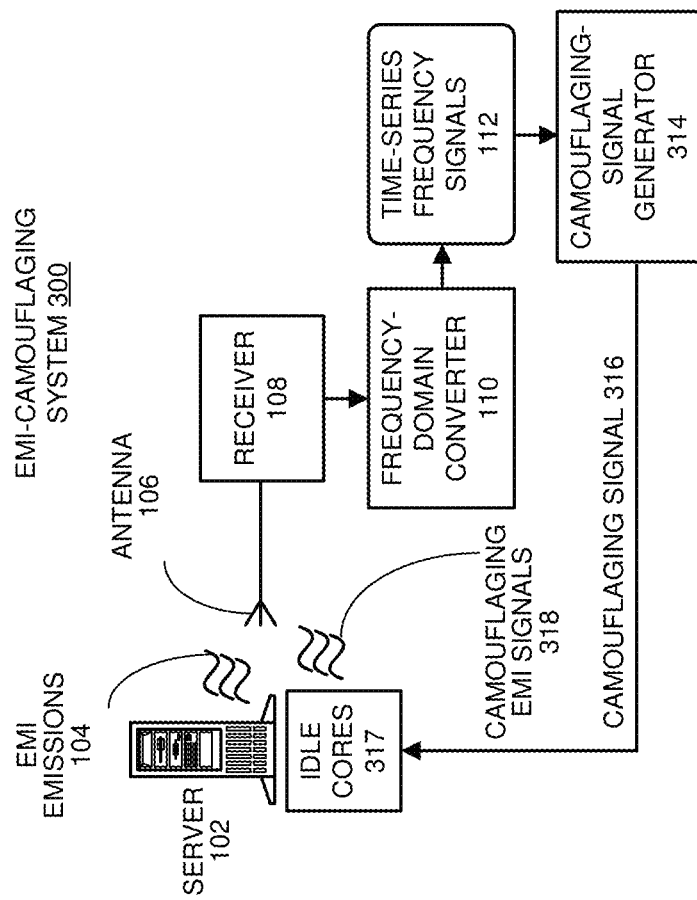
FIG. 3 illustrates an exemplary EMI-camouflaging system in accordance with the disclosed embodiments.

FIG. 3 illustrates an exemplary EMI-camouflaging system 300 in accordance with the disclosed embodiments. As illustrated in FIG. 3, a server 102 generates EMI emissions 104 during normal operation. These EMI emissions 104 can be monitored using an antenna 106 that converts the EMI emissions 104 into corresponding analog signals, which feed through a receiver 108 that converts the analog electrical into corresponding digital signals that feed into frequency-domain converter 110. Frequency-domain converter 110 performs an FFT operation on the digital signals that produces a set of time-series frequency signals 112. Next, time-series frequency signals 112 feed into a camouflaging-signal generator 314, which generates a corresponding camouflaging signal 316. Next, camouflaging signal 316 feeds into one or more idle cores 317 that generate camouflaging EMI signals 318, which effectively obfuscate the EMI fingerprints in EMI emissions 104.

We have developed three techniques to camouflage EMI fingerprints, namely: (1) time-domain camouflaging; (2) antiphase camouflaging; and (3) frequency-domain camouflaging.

The time-domain camouflaging technique is advantageous because it can be implemented immediately on the hundreds of thousands of legacy servers. For time-domain camouflaging, a software-defined radio (SDR) associated with each server monitors the dynamic amplitude of the EMI emissions in real time. Empirical results indicate that the amplitude of EMI emissions can vary significantly over time, reflecting the dynamic load profile of the computer system's central-processing units (CPUs) and memory. More specifically, the CPU utilization for individual cores in servers can oscillate between 100% utilization while executing a task and 0% utilization when idle. Whenever cores drop to idle between workload transactions, the time-domain camouflaging technique causes the cores to execute random transactions, such as computing the square root of a random number. These random transactions have interarrival times that, when superimposed with the real workload transactions, result in random EMI time series signals, as assessed in a trailing-window-history buffer using a standard Kolmogorov-Smirnov test statistic, which is a measure of the "whiteness" of the time-series signals. Note that superimposing random transactions during idle times to convert the interarrival times to random sequences is similar to "crypto salting," wherein random alphanumeric sequences are inserted ("salted") into passwords or other character sequences so that malicious users are unable to guess the random sequences while parsing hashes. Moreover, the time-domain camouflaging technique carefully times random transactions so that the sequence of interarrival times becomes random as quantified by a moving-window Kolmogorov-Smirnov test statistic.

For the antiphase camouflaging technique, the digitized sequence of EMI emissions is first passed through an FFT to create a power spectral density (PSD) frequency distribution for a trailing-window history buffer of EMI signals. Next, an "antiphase signal" is computed by lagging the phase angle of the PSD by 180 degrees with respect to the real-time measured spectrum. Then, an idle thread or idle core is used to generate the antiphase EMI waveform, which when superimposed on the "real" load-driven waveform, removes analyzable information content from the EMI emissions from the server. Note that instead of using an idle thread or idle core to perform the FFT and generate the antiphase signal, a special-purpose chip in the computer system can also be used to perform these operations.

For the frequency-domain camouflaging technique, we first perform an FFT to convert the EMI signals into a frequency-domain representation, and partition the output of the FFT operation into separate frequency bins. We then convert the output of the FFT operation into a frequency-domain representation, which involves partitioning the output of the FFT operation into separate frequency bins. Next, we produce the camouflaging signal. This involves generating noise at a frequency associated with a lowest-amplitude frequency bin, thereby filling in the lowest-amplitude frequency bin. We then iteratively repeat the process of filling in the lowest-amplitude frequency bin to smooth out the frequency-domain representation.

Process of Camouflaging EMI Signatures

Figure 4A:
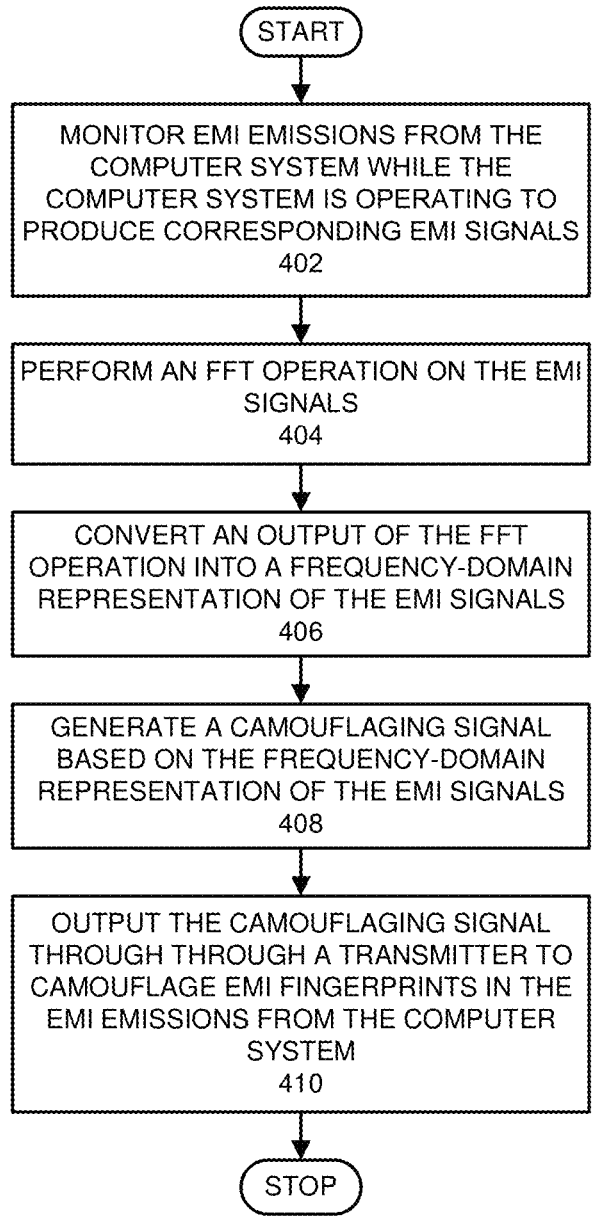
FIG. 4A presents a flowchart illustrating a frequency-domain camouflaging technique in accordance with the disclosed embodiments.

FIG. 4A presents a flowchart illustrating a frequency-domain camouflaging technique that camouflages electromagnetic interference (EMI) fingerprints in EMI emissions from a computing system to enhance system security. During operation, the system monitors the EMI emissions from the computer system while the computer system is operating to produce corresponding EMI signals (step 402). Next, the system performs an FFT operation on the EMI signals (step 404). The system then converts an output of the FFT operation into a frequency-domain representation of the EMI signals (step 406). Next, the system generates a camouflaging signal based on the frequency-domain representation of the EMI signals (step 408). Finally, the system outputs the camouflaging signal through a transmitter to camouflage EMI fingerprints in the EMI emissions from the computer system (step 410).

Figure 4B:
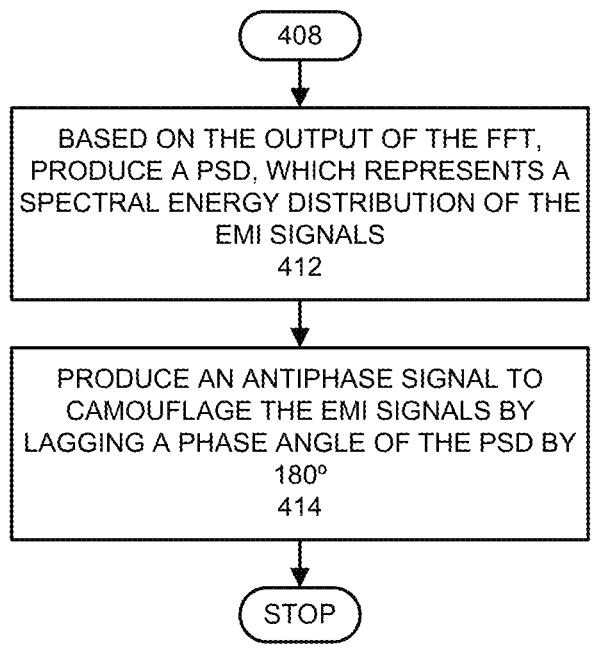
FIG. 4B presents a flowchart illustrating a technique for generating a camouflaging signal in accordance with the disclosed embodiments.

FIG. 4B presents a flowchart illustrating a technique for generating a camouflaging signal in accordance with the disclosed embodiments. (This flowchart illustrates in more detail the operations performed in step 408 of the flowchart that appears in FIG. 4A.) First, based on the output of the FFT, the system produces a power spectral density (PSD), which represents a spectral energy distribution of the EMI signals (step 412). Next, the system produces an antiphase signal to camouflage the EMI signals by lagging a phase angle of the PSD by 180° (step 414).

Figure 4C:
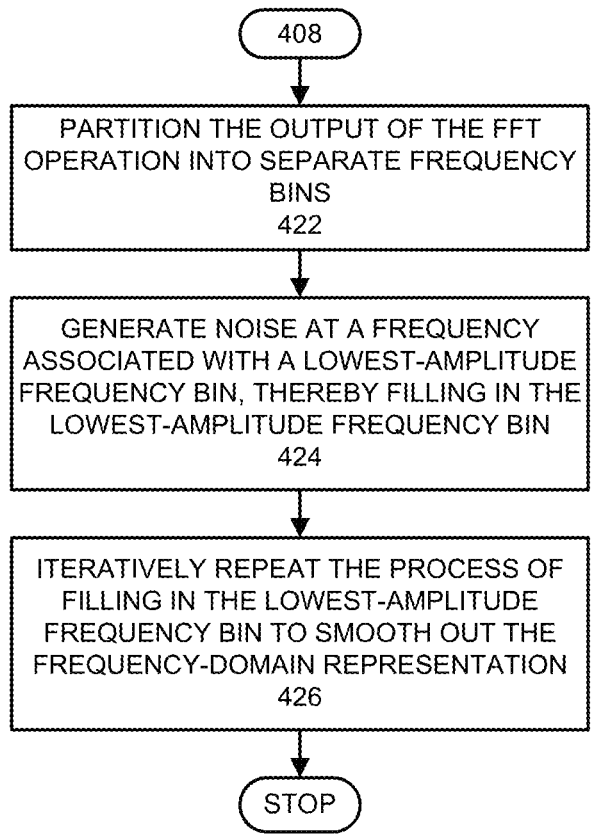
FIG. 4C presents a flowchart illustrating an alternative technique for generating a camouflaging signal in accordance with the disclosed embodiments.

FIG. 4C presents a flowchart illustrating an alternative technique for generating a camouflaging signal in accordance with the disclosed embodiments. (This flowchart illustrates in more detail the operations performed in step 408 of the flowchart that appears in FIG. 4A.) First, the system partitions the output of the FFT operation into separate frequency bins (step 422). Next, the system generates noise at a frequency associated with a lowest-amplitude frequency bin, thereby filling in the lowest-amplitude frequency bin (step 424). The system then iteratively repeats the process of filling in the lowest-amplitude frequency bin until a termination condition is met to smooth out the frequency-domain representation (step 426). As mentioned above, this termination condition can involve ensuring that the amplitude of each frequency bin is within a pre-specified percentage of an average amplitude for all of the frequency bins.

Figure 5:
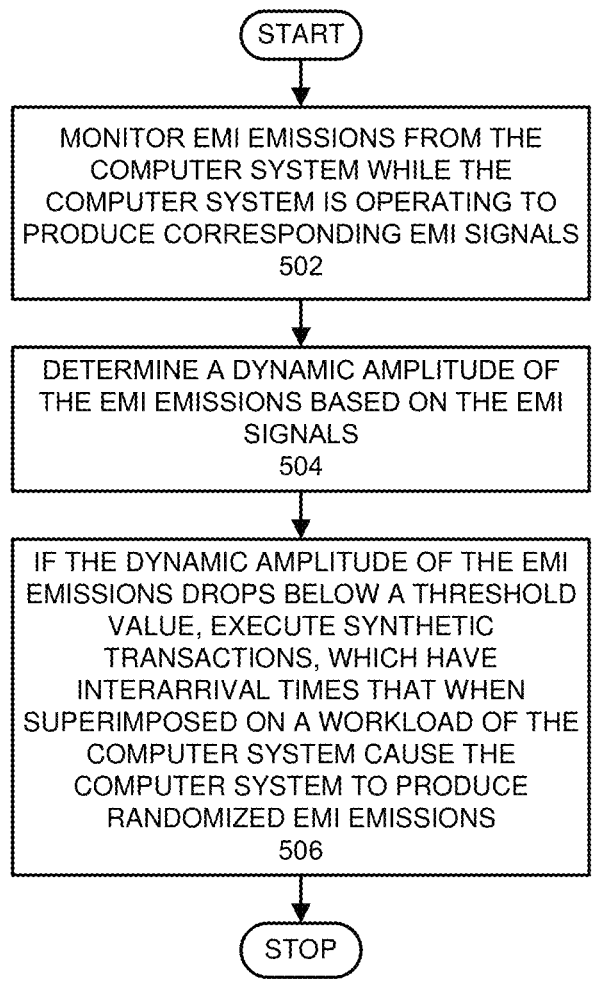
FIG. 5 presents a flowchart illustrating a time-domain camouflaging technique in accordance with the disclosed embodiments.

FIG. 5 presents a flowchart illustrating a time-domain camouflaging technique that camouflages EMI fingerprints in EMI emissions from a computing system to enhance system security. During operation, the system monitors the EMI emissions from the computer system during operation of the computer system to produce corresponding EMI signals (step 502). Next, the system determines a dynamic amplitude of the EMI emissions based on the EMI signals (step 504). If the dynamic amplitude of the EMI emissions drops below a threshold value, the system executes synthetic transactions, which have interarrival times that when superimposed on a workload of the computer system cause the computer system to produce randomized EMI emissions (step 506).

CONCLUSION

The above-described EMI fingerprint camouflaging techniques can be used to effectively mitigate security vulnerabilities in single-tenant cloud-computing architectures and even systems that provide air-gap security. Moreover, the above-described EMI fingerprint camouflaging techniques involve minimal additional hardware and can therefore be implemented relatively inexpensively.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for camouflaging electromagnetic interference (EMI) EMI fingerprints in EMI emissions from a computer system to enhance system security, comprising:
    monitoring the EMI emissions from the computer system during operation of the computer system to produce corresponding EMI signals;
    determining a dynamic amplitude of the EMI emissions based on the EMI signals; and
    when the dynamic amplitude of the EMI emissions drops below a threshold value, executing synthetic transactions, which have interarrival times that when superimposed on a workload of the computer system cause the computer system to produce randomized EMI emissions.

2. The method of claim 1, wherein executing the synthetic transactions involves using one or more idle cores in the computer system to execute the synthetic transactions.

3. The method of claim 1, wherein executing the synthetic transactions involves using a special-purpose chip in the computer system to execute the synthetic transactions.

4. The method of claim 1, wherein executing the synthetic transactions involves using one or more idle threads in the computer system to execute the synthetic transactions.

5. The method of claim 1, wherein monitoring the EMI emissions from the computer system involves using one or more of the following:
    an external antenna;
    a radiofrequency demodulator;
    a software-defined radio;
    a dongle, which is coupled to a port of the computer system;
    an electrical lead, which is coupled to a ground line in the computer system; and
    an electronic device located in a hard drive slot filler, which is inserted into a hard drive slot in the computer system.

6. The method of claim 1, wherein the randomized EMI emissions are random with respect to a moving-window Kolmogorov-Smirnov test statistic.

7. The method of claim 1, wherein the computer system comprises a server in an enterprise computer system.

8. A non-transitory computer-readable storage medium storing instructions that when executed by a computer cause the computer to perform a method for camouflaging electromagnetic interference (EMI) EMI fingerprints in EMI emissions from a computer system to enhance system security, comprising:
    monitoring the EMI emissions from the computer system during operation of the computer system to produce corresponding EMI signals;
    determining a dynamic amplitude of the EMI emissions based on the EMI signals; and
    when the dynamic amplitude of the EMI emissions drops below a threshold value, executing synthetic transactions, which have interarrival times that when superimposed on a workload of the computer system cause the computer system to produce randomized EMI emissions.

9. The non-transitory computer-readable storage medium of claim 8, wherein executing the synthetic transactions involves using one or more idle cores in the computer system to execute the synthetic transactions.

10. The non-transitory computer-readable storage medium of claim 8, wherein executing the synthetic transactions involves using a special-purpose chip in the computer system to execute the synthetic transactions.

11. The non-transitory computer-readable storage medium of claim 8, wherein executing the synthetic transactions involves using one or more idle threads in the computer system to execute the synthetic transactions.

12. The non-transitory computer-readable storage medium of claim 8, wherein monitoring the EMI emissions from the computer system involves using one or more of the following:
    an external antenna;
    a radiofrequency demodulator;
    a software-defined radio;
    a dongle, which is coupled to a port of the computer system;
    an electrical lead, which is coupled to a ground line in the computer system; and
    an electronic device located in a hard drive slot filler, which is inserted into a hard drive slot in the computer system.

13. The non-transitory computer-readable storage medium of claim 8, wherein the randomized EMI emissions are random with respect to a moving-window Kolmogorov-Smirnov test statistic.

14. The non-transitory computer-readable storage medium of claim 8, wherein the computer system comprises a server in an enterprise computer system.

15. A system that camouflages electromagnetic interference (EMI) EMI fingerprints in EMI emissions from a computer system to enhance system security, comprising:
at least one processor and at least one associated memory; and
a camouflaging mechanism that executes on the at least one processor, wherein the camouflaging mechanism:
monitors the EMI emissions from the computer system during operation of the computer system to produce corresponding EMI signals;
determines a dynamic amplitude of the EMI emissions based on the EMI signals; and
when the dynamic amplitude of the EMI emissions drops below a threshold value, executes synthetic transactions, which have interarrival times that when superimposed on a workload of the computer system cause the computer system to produce randomized EMI emissions.

16. The system of claim 15, wherein while executing the synthetic transactions, the camouflaging mechanism uses one or more idle cores in the computer system to execute the synthetic transactions.

17. The system of claim 15, wherein while executing the synthetic transactions, the camouflaging mechanism uses a special-purpose chip in the computer system to execute the synthetic transactions.

18. The system of claim 15, wherein while executing the synthetic transactions, the camouflaging mechanism uses one or more idle threads in the computer system to execute the synthetic transactions.

* * * * *

UNITED STATES PATENT AND TRADEMARK OFFICE
CERTIFICATE OF CORRECTION

PATENT NO. : 11,412,387 B2
APPLICATION NO. : 17/230156
DATED : August 9, 2022
INVENTOR(S) : Gross et al.

It is certified that error appears in the above-identified patent and that said Letters Patent is hereby corrected as shown below:

In the Drawings

On sheet 2 of 6, in FIG. 4A, under Reference Numeral 410, Line 2, delete "THROUGH THROUGH" and insert -- THROUGH --, therefor.

Signed and Sealed this
Twenty-seventh Day of December, 2022

Katherine Kelly Vidal
*Director of the United States Patent and Trademark Office*